US007475546B2

(12) United States Patent
Snyder et al.

(10) Patent No.: US 7,475,546 B2
(45) Date of Patent: Jan. 13, 2009

(54) AUGMENTOR PILOT NOZZLE

(75) Inventors: Timothy S. Snyder, Glastonbury, CT (US); Christopher R. Brdar, Rocky Hill, CT (US); John R. Buey, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/231,181

(22) Filed: Sep. 20, 2005

(65) Prior Publication Data

US 2007/0220891 A1 Sep. 27, 2007

Related U.S. Application Data

(63) Continuation of application No. 10/436,630, filed on May 13, 2003, now Pat. No. 6,971,239.

(51) Int. Cl.
*F02K 3/10* (2006.01)

(52) U.S. Cl. ........................................................ 60/761

(58) Field of Classification Search .................. 60/765, 60/749, 750, 761

See application file for complete search history.

(56) References Cited

U.S. PATENT DOCUMENTS 2,651,178 A 9/1953 Williams
2,711,070 A * 6/1955 Henning ...................... 60/765
3,151,453 A * 10/1964 Lefebvre et al. ............. 60/765
3,236,048 A * 2/1966 Spears, Jr. .................... 60/761
4,798,048 A 1/1989 Clements
4,887,425 A 12/1989 Vdoviak
5,020,318 A 6/1991 Vdoviak
5,918,465 A 7/1999 Schmid

OTHER PUBLICATIONS

European Search Report for EP Patent Application No. 04252606.1.

* cited by examiner

*Primary Examiner*—Ted Kim
(74) *Attorney, Agent, or Firm*—Bachman & LaPointe, P.C.

(57) ABSTRACT

A gas turbine engine augmentor nozzle has an inlet for connection to an augmentor fuel conduit and an outlet for expelling a spray of fuel. A passageway between the inlet and outlet is at least partially bounded by outlet end surface portions diverging from each other. The nozzle may be used as a replacement for a non-divergent nozzle and may reorient a fuel jet centerline toward radial.

7 Claims, 4 Drawing Sheets

84 80 82 72 602 42 162 160 164 153 152 70 $\theta_3$ $\theta_6$ 600 150 60 58 66 64 56 62 R 128 132 122 126 $\theta_2$ 130

AUGMENTOR PILOT NOZZLE

CROSS REFERENCE TO RELATED APPLICATION

This is a continuation of Ser. No. 10/436,630, filed May 13, 2003, now U.S. Pat. No. 6,971,239, and entitled Augmentor Pilot Nozzle, the disclosure of which is incorporated by reference herein as if set forth at length.

BACKGROUND OF THE INVENTION

This invention relates to turbine engines, and more particularly to turbine engine augmentors.

Afterburners or thrust augmentors are known in the industry. A number of configurations exist. In a typical configuration, exhaust gases from the turbine pass over an augmentor centerbody. Additional fuel is introduced proximate the centerbody and is combusted to provide additional thrust. In some configurations, the augmentor centerbody is integrated with the turbine centerbody. In other configurations, the augmentor centerbody is separated from the turbine centerbody with a duct surrounding a space between the two. U.S. Pat. Nos. 5,685,140 and 5,385,015 show exemplary integrated augmentors.

The augmentor may feature a number of flameholder elements for initiating combustion of the additional fuel. Piloting devices are used to stabilize the flame on the flameholders which, in turn, distribute the flame across the flow path around the centerbody.

SUMMARY OF THE INVENTION

Accordingly, one aspect of the invention involves a turbine engine. A centerbody is positioned within a gas flowpath from upstream to downstream and has a downstream tailcone and a pilot proximate an upstream end of the tailcone. A number of vanes are positioned in the flowpath outboard of the centerbody. A number of fuel injectors are at inboard ends of associated spray bars extending through associated vanes. Each injector has an inlet, an outlet, and a passageway between the inlet and the outlet. The passageway has a first portion directing fuel to impact a transversely extending downstream divergent surface portion and be deflected by said surface portion to be discharged from the injector. A number of igniters are positioned within associated ones of the vanes to ignite the fuel discharged from associated ones of the fuel injectors.

In various implementations, the passageway may have a second downstream divergent portion facing and spaced apart from the downstream divergent surface portion and at an angle of less than 5° thereto. The pilot may comprise a channel having upstream and downstream rims and a base. Each injector may be oriented so that a centerline of a jet of fuel discharged from such injector is directed toward the base of the channel. The downstream divergent surface portion may be an inboard surface of a transversely-extending slot. The slot may have a pair of lateral surface portions at lateral extremes of the divergent surface portion and diverging at an angle of 55°-95°.

Another aspect of the invention involves a turbine engine augmentor nozzle. The nozzle has a proximal inlet for connection to an augmentor fuel conduit. A nozzle has a distal outlet for expelling a spray of fuel. A passageway extends from upstream to downstream between the inlet and outlet, the passageway being bounded by outlet end surface portions including lateral portions diverging downstream. In various implementations, the lateral portions may diverge downstream at an angle of 55°-95°. The lateral portions may diverge downstream at an angle of 60°-80°.

Another aspect of the invention involves a gas turbine engine augmentor nozzle wherein a passageway is bounded by outlet end surface portions defining a laterally elongate slot. The surface portions may include lateral surface portions diverging from each other at an angle of 55°-95° and transverse surface portions extending between the lateral surface portions and diverging from each other at angle of 0°-5°.

Another aspect of the invention involves a method for remanufacturing a turbine engine augmentor having a vane and a centerbody. A first fuel nozzle is removed and replaced with a second fuel nozzle. The second fuel nozzle is configured to direct a centerline of a fuel jet in a more radial orientation than a jet of the first fuel nozzle and is configured so that the jet of the second fuel nozzle is more diffuse in at least one direction than the jet of the first fuel nozzle. In various implementations, the second fuel nozzle is configured so that its jet is asymmetric whereas the jet of the first fuel nozzle is symmetric around its centerline.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
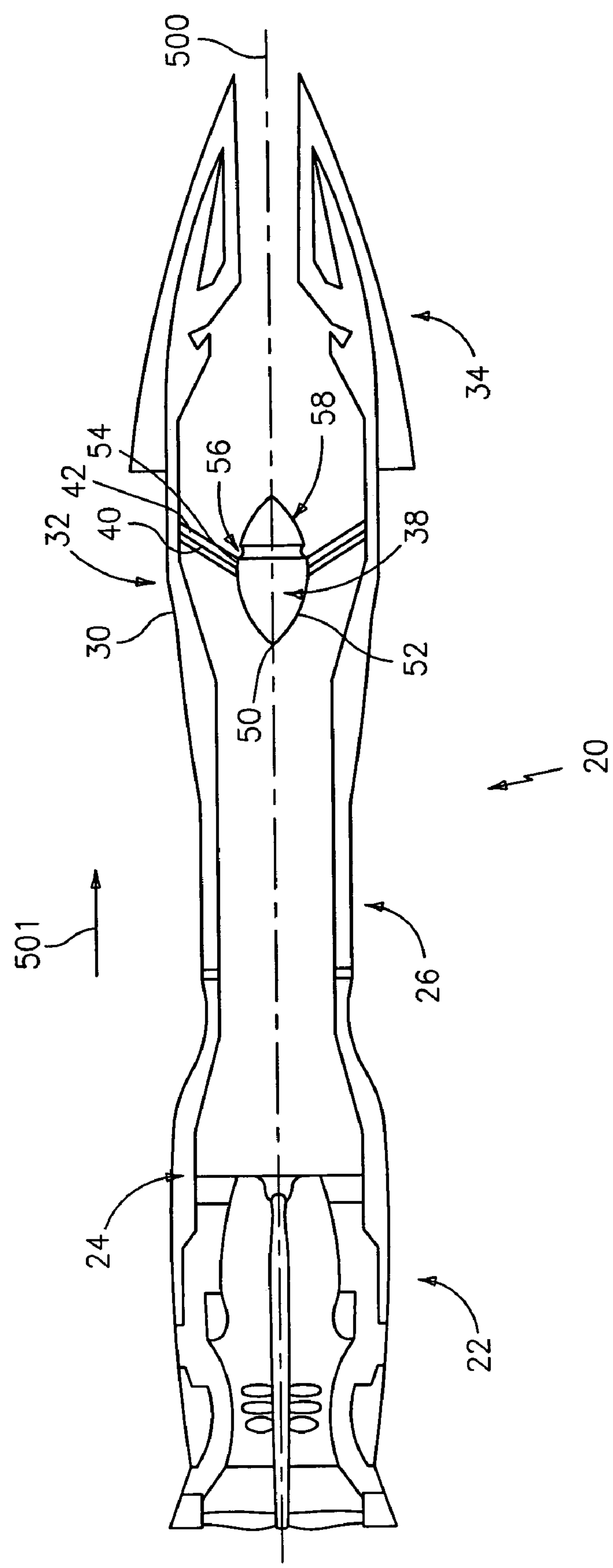
FIG. 1 is a schematic longitudinal sectional view of an aircraft powerplant.

FIG. 1 shows a powerplant 20 having a central longitudinal axis 500. From fore to aft and upstream to downstream in an aftward direction 501, the powerplant includes a turbine engine 22 having a downstream turbine exhaust case (TEC) 24. A duct extension 26 extends from the TEC 24 to join with a housing 30 of an augmentor 32. A thrust vectoring nozzle assembly 34 extends downstream from the housing 30. The augmentor 32 includes a centerbody 38 centrally mounted within the gas flowpath by means of vanes 40 having trailing edge flameholders 42.

The centerbody 38 is generally symmetric around the axis 500. The centerbody has a forward tip 50 from which a continuously curving convex forebody or ogive 52 extends rearward until reaching a longitudinal or nearly longitudinal transition region 54 adjacent the flameholders 40. Aft of the transition region, the centerbody surface defines a pilot channel 56. A tailcone surface 58 extends aft from the pilot to an aft extremity of the centerbody.

Figure 2:
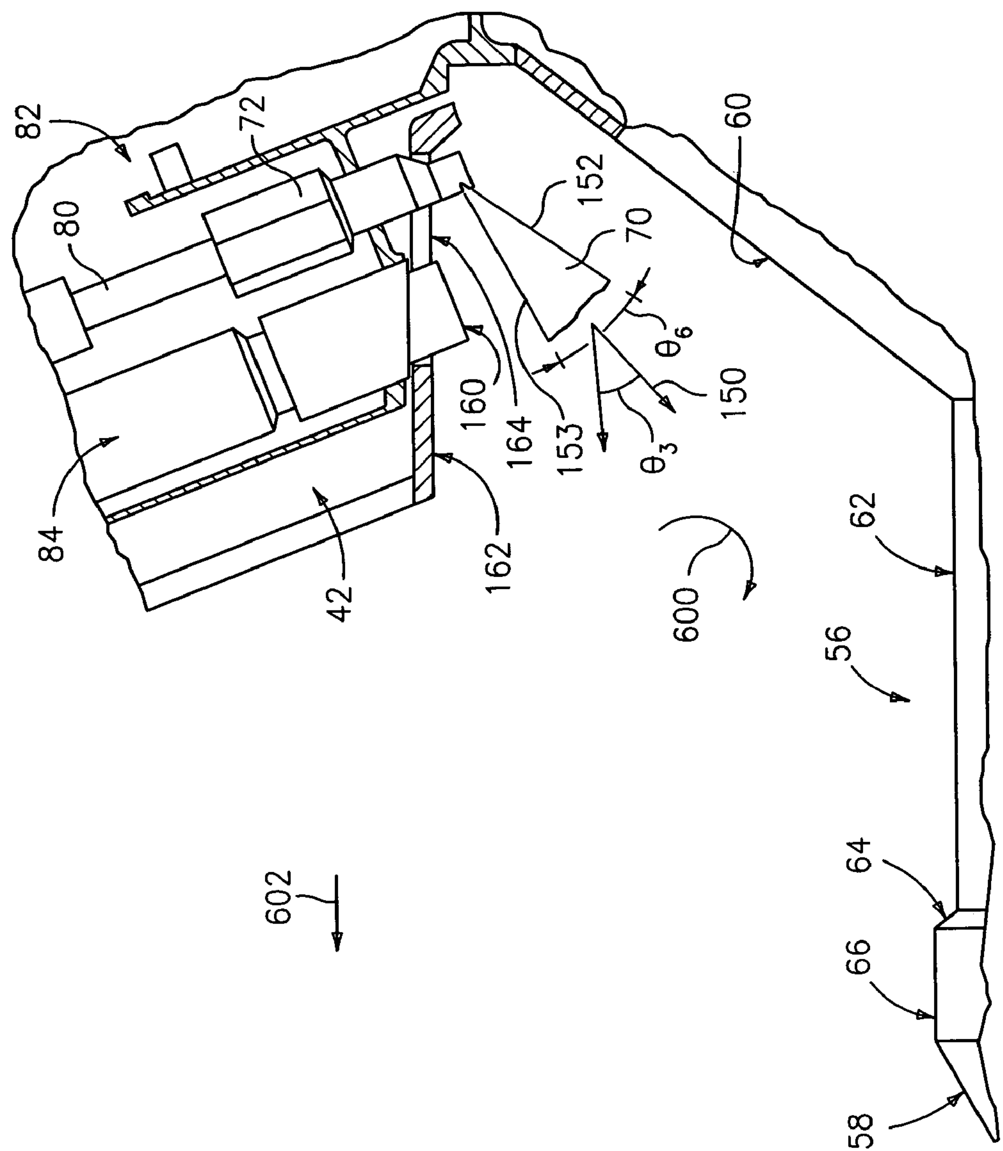
FIG. 2 is a partial semi-schematic longitudinal cutaway view of a first augmentor for use in the powerplant of FIG. 1

FIG. 2 shows further details of an exemplary pilot. The annular pilot channel 56 is formed by a frustoconical surface 60 extending rearward and radially inward from a junction with the transition region 54 of FIG. 1. The surface 60 forms the fore (upstream) wall of an annular channel, with the junction forming the fore rim. A longitudinal surface 62 extends aft from a junction with the inboard extremity of the surface 60 and forms a base of the channel. A frustoconical aft wall surface 64 extends rearward and radially outward from a junction with the surface 62 and forms an aft wall of the channel. A longitudinal rim surface 66 extends aft from a junction with the surface 64 that defines a channel aft rim. The surface 66 provides a transition to the tailcone surface 58. A jet 70 of fuel is delivered to the pilot via nozzle 72 in an appropriate conduit. An exemplary conduit is shown as a spraybar 80 mounted within a vane body 82 ahead of the flameholder 42. The spraybar 80 has a plurality of lateral nozzles (not shown) delivering jets of fuel from the two sides of the body 82. The nozzle 72 is positioned at the end of the spraybar. In operation, the pilot channel serves to divert the generally recirculating pilot flow 600 from a principal (main) flow 602. The jet 70 of fuel is introduced to the pilot flow 600 and combustion is induced by electric spark from an associated igniter 84. Fuel is also delivered to the principal flow 602 via the spraybar lateral nozzles noted above. The combusted/combusting fuel/air mixture in the flow 600 propagates around the pilot channel 56 stabilize and propagate flame radially outward to the flameholder bodies 82. Optionally, the centerbody may be provided with several conduits (not shown) for ejecting air jets. There may be a ring of such conduits. The conduits may be supplied from one or more supply conduits (not shown) extending through or along the vanes to the centerbody ahead of the pilot.

Figure 3:
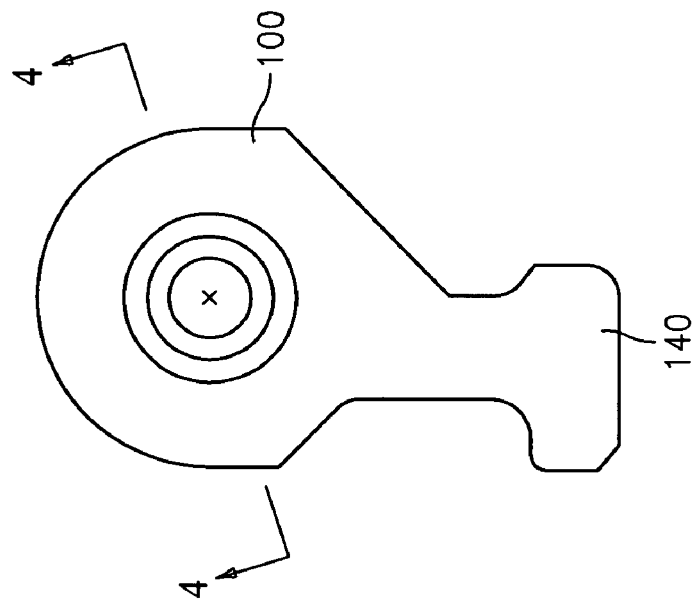
FIG. 3 is an upstream end view of a nozzle of the augmentor of FIG. 2.
Figure 4:
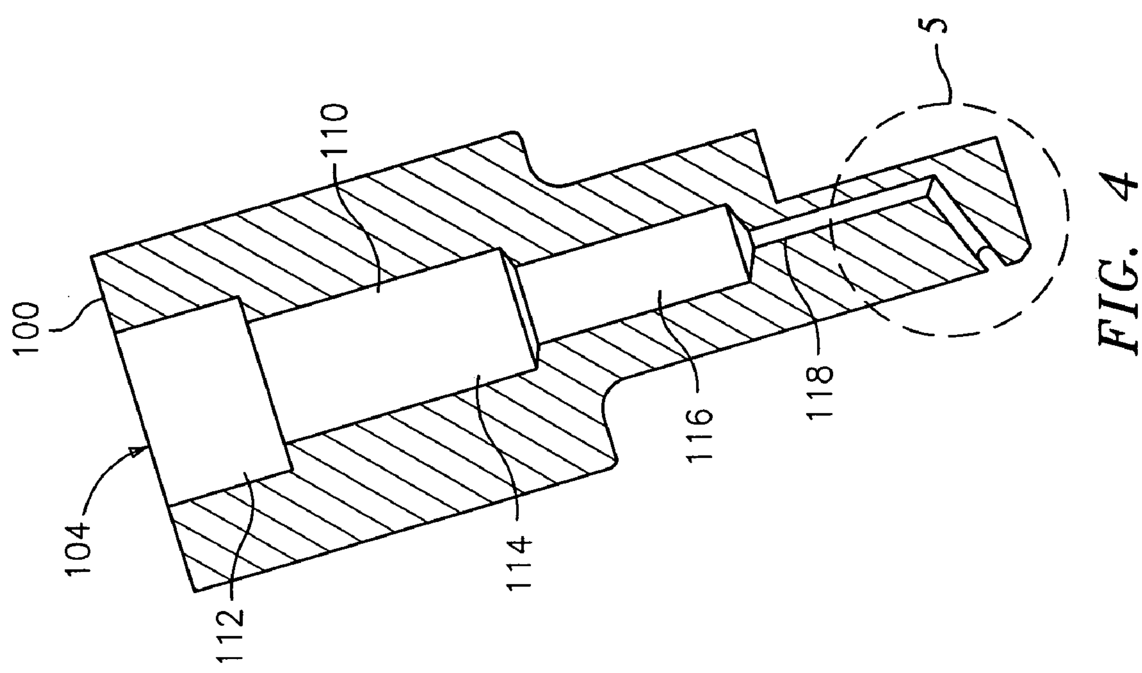
FIG. 4 is a longitudinal sectional view of the nozzle of FIG. 3, taken along line 4-4.
Figure 5:
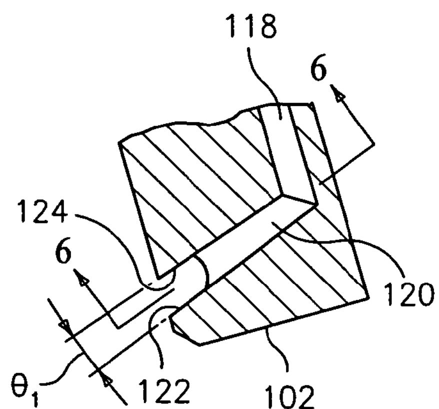
FIG. 5 is an enlarged view of a distal portion of the nozzle of FIG. 4.
Figure 6:
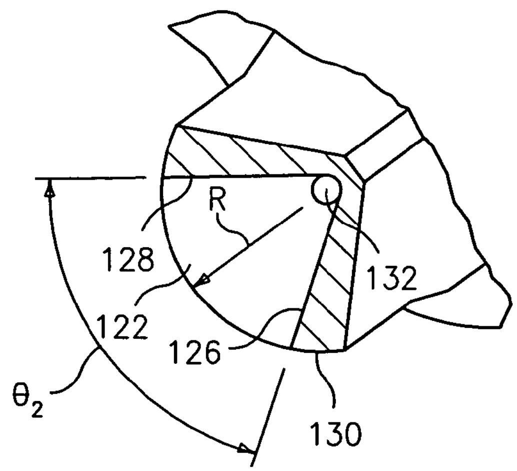
FIG. 6 is a transverse sectional view of the nozzle of FIG. 5, taken along line 6-6.
Figure 7:
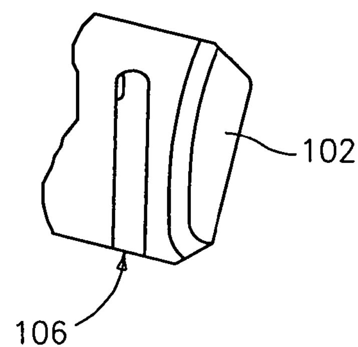
FIG. 7 is a side view of the distal portion of the nozzle of FIG. 5.

FIGS. 3-7 show further details of the nozzle 72. The nozzle extends from a proximal (upstream) end 100 (FIG. 3) to a distal (downstream) end 102 (FIG. 5). The nozzle has an inlet 104 at the upstream end and an outlet 106 (FIG. 7) at the distal end. A passageway 110 extends between the inlet and outlet and has a stepped longitudinal portion extending from the upstream end and including a series of progressively smaller diameter bores 112, 114, 116 and 118. The distal (downstream) end of the final/smallest bore 118 merges with a proximal (upstream) end of a slot 120, the downstream portion of which forms the outlet 106. The slot 120 has a pair of generally flat transversely-extending distal and proximal walls 122 and 124 joined at their sides by lateral walls 126 and 128 (FIG. 6). The walls 122 and 124 are at an angle $\theta_1$ to each other and the lateral walls 126 and 128 are divergent at an angle $\theta_2$ to each other. In the exemplary embodiment, $\theta_1$ is relatively shallow (e.g., between about 0 and 5°, whereas $\theta_2$ is substantially greater (e.g., between about 55° and 95° (more narrowly 60° and 80° with an exemplary nominal 75°±2°). The slot 120 opens on a circumferential surface 130 of the distal portion of the nozzle having a radius R (FIG. 6). In the exemplary embodiment, the center of curvature of this surface 130 is approximately coincident with the center 132 of the opening of the distal bore 118 to the slot 120. FIG. 3 further shows the nozzle as having a fuel pad 140 for lateral injection of fuel. In a basic method of manufacture, the overall shape of the nozzle may be cast and the bores then drilled and the slot machined such as via an end mill.

Figure 8:
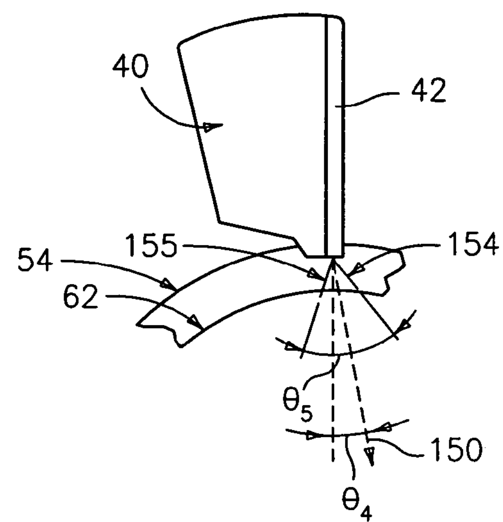
FIG. 8 is a forward-looking view of a trailing end of a vane of the augmentor of FIG. 2.

In operation, the downstream-moving fuel exiting the distal bore 118 impacts the surface 122 and fans outward, constrained by the walls 126 and 128. This deflection creates a relatively flat fan spray. The surface 124 may also help define the fan but is not as important as the surface 122. When compared with a similar flow jet emitted from a circular outlet having a cylindrical wall upstream thereof, the jet 70 is more spread out, at least in the direction of divergence of the slot. The filming effect of the deflection by the surface 122 contributes to further reduced droplet size. Returning to FIG. 2, the jet is shown having a centerline 150 and approximate inboard and outboard extremes 152 and 153. The centerline 150 is at a projected angle $\theta_3$ relative to the longitudinal aftward direction 602. The projection is associated with the centerline 150 being oriented slightly skew to the engine axis and having a projected angle $\theta_4$ relative to a radial direction. FIG. 8 further shows the lateral extremes 154 and 155 of the jet fanning out at an angle $\theta_5$ which may be slightly more than $\theta_2$. In an exemplary implementation, $\theta_3$ is approximately 40° (more broadly 30°-50°) and $\theta_4$ is 25° (more broadly 20°-30°). Referring to FIG. 2, the angle $\theta_6$ between inboard and outboard extremes 152 and 153 will reflect more dispersion relative to its associated surface angle $\theta_1$ than does the angle $\theta_5$ to the relatively larger $\theta_2$. An exemplary $\theta_6$ is in the vicinity of 20°-40°.

Advantageously, the slot configuration is selected in view of the position and orientation of the nozzle and dimensions of the pilot so as to provide reliable augmentor lighting. It is desirable to provide an appropriate mist of fuel within the pilot flow 600. Reliable ignition of this fuel involves having sufficient quantity and fineness of droplets in proximity to the operative (e.g., inboard) end 160 of the igniter 84. This operative end protrudes from a longitudinally oriented inboard aft surface 162 of the vane spaced aft of the nozzle outlet and along with the nozzle through one or more apertures (e.g., a common aperture 164) in such surface. Flameholder cooling air may also pass radially inward through such aperture(s). The angle $\theta_4$ of FIG. 8 is selected in view of local tangential velocity components of the air flowing over the vanes so as to inject fuel on either side of the igniter circumferentially. In the exemplary embodiment, the jet centerline 150 is directed toward a midportion of the surface 62 (e.g., in the central 50% thereof). This is in distinction to the prior art circular cylindrical outlets oriented at much shallower angles so as to be directed aft of such a surface. This redirection facilitates greater recirculation of the fuel in the flow 600. This is facilitated because the more defuse spray places appropriate amounts of fuel in proximity to the igniter operative end 160 with the centerline 150 at an orientation facing farther away from such end.

One or more embodiments of the present invention have been described. Nevertheless, it will be understood that various modifications may be made without departing from the spirit and scope of the invention. For example, although the illustrated outlet surfaces are shown as straight in section, other configurations such as curved horn-like configurations are possible. In such curved configurations, identified angles could refer to local angles or average angles of portions of the surfaces. Although the illustrated slot is asymmetric about its centerline, symmetric outlets (e.g., outlets producing a conical jet of relatively high included angle (e.g., 80°-120° or, more narrowly, 90°-110°), are also possible to provide alternate divergence. The inventive pilot may be applied in a retrofit or redesign of an otherwise existing engine. In such cases, various properties of the pilot would be influenced by the structure of the existing engine. While illustrated with respect to an exemplary remote augmentor situation, the principles may be applied to non-remote augmentors. Accordingly, other embodiments are within the scope of the following claims.

What is claimed is:

1. A gas turbine engine augmentor nozzle comprising:

a proximal inlet for connection to an augmentor fuel spraybar;

a distal outlet for expelling a spray of fuel; and a passageway extending from upstream to downstream between the inlet and outlet, the passageway being bounded by outlet end surface portions defining a laterally elongate slot, the slot having a pair of generally flat transversely extending distal and proximal walls which have at least one arcuate outlet end surface portion, the distal wall positioned relative to a portion of the passageway so that fuel exiting the portion impacts the distal wall and fans outward.

2. The nozzle of claim 1 wherein:

the passageway portion is a last bore of a series of progressively smaller diameter bores.

3. The nozzle of claim 1 further comprising:

a fuel pad for lateral injection of fuel.

4. The nozzle of claim 3 formed as a single casting.

5. The nozzle of claim 1 wherein:

the slot extends from an end of the passageway portion.

6. The nozzle of claim 1 wherein:

the slot is made by machining.

7. The nozzle of claim 1 wherein:

the outlet is on a curved surface of a distal portion of the nozzle.

* * * * *